(12) United States Patent
Snyder (10) Patent No.: US 8,326,502 B2
(45) Date of Patent: Dec. 4, 2012

(54) ELECTRIC VEHICLE CONTROL

(76) Inventor: Mark Snyder, Fountain Valley, CA (US)

( * ) Notice: Subject to any disclaimer, the term of this patent is extended or adjusted under 35 U.S.C. 154(b) by 325 days.

(21) Appl. No.: 12/651,292

(22) Filed: Dec. 31, 2009

(65) Prior Publication Data

US 2010/0168946 A1  Jul. 1, 2010

Related U.S. Application Data (60) Provisional application No. 61/142,103, filed on Dec. 31, 2008, provisional application No. 61/142,099, filed on Dec. 31, 2008, provisional application No. 61/142,090, filed on Dec. 31, 2008.

(51) Int. Cl.
*H02P 6/08* (2006.01)
*B60L 11/00* (2006.01)

(52) U.S. Cl. ............... 701/55; 701/22; 701/54

(58) Field of Classification Search ............... 701/51, 701/54, 55, 70, 22; 318/254.1, 276
See application file for complete search history.

(56) References Cited

U.S. PATENT DOCUMENTS

| | | | |
|---|---|---|---|
| 3,747,438 A * | 7/1973 | Toyoda et al. ............... | 477/120 |
| 5,804,724 A | 9/1998 | Lansberry et al. | |
| 5,811,946 A | 9/1998 | Mullin et al. | |
| 6,081,091 A | 6/2000 | Mitchell et al. | |
| 6,144,198 A | 11/2000 | Howard et al. | |
| 6,549,871 B1 | 4/2003 | Mir et al. | |
| 6,686,714 B2 | 2/2004 | Trifilo | |
| 6,710,567 B2 | 3/2004 | Heydt et al. | |
| 6,973,377 B2 * | 12/2005 | Majstorovic et al. ............. | 701/1 |
| 7,013,207 B2 * | 3/2006 | Majstorovic et al. ........... | 701/51 |
| 7,030,582 B2 | 4/2006 | Masino | |
| 7,239,098 B2 | 7/2007 | Masino | |
| 7,247,122 B2 * | 7/2007 | Shah ............... | 477/68 |
| 7,288,956 B2 | 10/2007 | De Cock et al. | |
| 7,385,364 B1 | 6/2008 | Rana et al. | |
| 2006/0155447 A1 * | 7/2006 | Uken et al. ............... | 701/50 |
| 2007/0132446 A1 | 6/2007 | Kleinau et al. | |
| 2008/0018285 A1 | 1/2008 | Wu et al. | |
| 2008/0210497 A1 * | 9/2008 | Jeon ............... | 188/72.1 |
| 2010/0256883 A1 * | 10/2010 | Sauter ............... | 701/65 |
| 2011/0054726 A1 * | 3/2011 | Noumura ............... | 701/22 |

* cited by examiner

*Primary Examiner* — Drew Brown
(74) *Attorney, Agent, or Firm* — Kenneth L. Green (57) ABSTRACT

A method for controlling an electric vehicle includes computing an electric motor RPM based on a computed Back Electromotive Force (BEMF). Modern electric vehicle designs include intelligent control of the electric motors and transmissions to respond to operator controls and provide efficient operation to extend battery life. An accurate measure of motor RPM is required for such control. Various methods are available for obtaining motor RPM, but most require external sensors susceptible to damage from road debris and the like. The BEMF is proportional to motor speed and independent of motor load. The BEMF may further be computed from the difference between IR loss and motor voltage. The motor RPM is them computed from BEMF using data recorded for the individual motor.

2 Claims, 6 Drawing Sheets

ELECTRIC VEHICLE CONTROL

The present application claims the priority of U.S. Provisional Patent Application Ser. No. 61/142,103 filed Dec. 31, 2008, U.S. Provisional Patent Application Ser. No. 61/142,099 filed Dec. 31, 2008, and U.S. Provisional Patent Application Ser. No. 61/142,090 filed Dec. 31, 2008 which applications are incorporated in its entirety herein by reference.

BACKGROUND OF THE INVENTION

The present invention relates to electric vehicles and in particular to a electronic systems and methods for control of the vehicle.

Due to the basic characteristics of electric motors, it is beneficial for electric vehicles to be fitted with at least some form of multi-speed, automatic transmission which selects shift points to operate the electric motor or motors in a predetermined RPM range. The multi-speed transmission is very important because it is very inefficient to achieve enough torque from a cost effective drive system to accelerate quickly or climb a steep grade when a vehicle is operating at low speed, without the ability to operate at least one motor in its higher speed range.

Improved methods for selecting the shift points for a multi-speed, automatic transmission in an electric vehicle have been proposed by the inventor of the present invention, but these methods rely on parameters including accurate vehicle speed estimates. Known electric vehicles measure speed in various ways, generally using light or magnetism, to measure the speed of an exposed moving part of the drive train. The whole system, including the wiring, is exposed to the elements and can be easily damaged or knocked out of adjustment. It is also subject to failure due to dirt, water, mud and other debris or erroneous signals created from outside sources. The vehicle speed may obtained in various ways, but is generally obtained using measurements of light or magnetism, to obtain the speed of an exposed moving part of the drive train which is proportional to vehicle speed. The speed measurement system adds cost and weight, and the entire speed measurement system, including wiring, is often exposed to the elements and can be easily damaged or knocked out of adjustment. The speed measurement system is also subject to failure due to dirt, water, mud, or other debris and errors may be introduced by erroneous signals originating from outside sources.

Accordingly, the need exists for a method to determine the speed of the vehicle, which method is not vulnerable to the failures mentioned above.

Known electric vehicles further implement a power control operator interface, which determines the amount of power that will be applied to the drive wheel(s) of an electric vehicle and sometimes, a single braking control operator interface for both friction braking and regenerative braking. The power control operator interface, often called the "accelerator pedal", "gas pedal", or "throttle", is commonly positioned as a right positioned pedal on the floorboard of the vehicle, or as a twist-grip on the right handlebar. Similarly, the braking control operator interface is commonly positioned to the left of the power control operator interface on the floorboard of the vehicle, or as a lever mounted on the handlebar and connected to mechanisms which apply the regenerative braking and friction braking to decelerate the vehicle.

Each of the operator control interfaces, for both the control of the application of power and regenerative braking, actuate a corresponding transducer which converts a mechanical force and/or displacement into an electrical output signal comprising a voltage, a resistance, an inductance, a current, a digital signal, or other means which varies as a function the mechanical position and/or displacement of the operator control interfaces. The electrical output signals are provided to the electronic controller as inputs to indicate the amount of power or regenerative braking the operator desires.

In mechanics, power is generally defined in terms of speed multiplied by force, or in the case of rotational motion, power is defined in terms rotational speed multiplied by torque. In electrical terms, power is defined in terms of current multiplied by the voltage. As an electric motor transforms electrical power into rotational mechanical power, the output shaft speed is about proportional to the applied voltage, and the output torque is about proportional to the applied current.

There are two common methods used to control the power applied to a drive system. The first method uses the signal generated by the power control operator interface described above, to create power from the motor controller to the motor(s), where the power is controlled by varying the duty cycle of the Pulse Width Modulated (PWM) power supplied to the motor to maintain a desired average voltage which is a function of the magnitude of the control signal. As a result, this will vary the speed of the motor output shaft, and resulting vehicle speed. Most controllers using this method of varying the output voltage to control the power will implement current limiting circuitry to protect the controller, motor, wiring and the mechanical drive train. The second method to control the power applied to the drive motors is also to vary the duty cycle of a Pulse Width Modulated (PWM) power supplied to the motor but to maintain a desired averaged current which is a function of the input control signal. As a result, this will vary the torque of the motor output shaft, and resulting vehicle driving force and acceleration. In this case, the maximum output voltage is only limited by the applied input voltage to the motor controller.

Each of the above methods to control an electric vehicle drive motor electrical power has its drawbacks. The first, using the power control operator interface to control the power signal provided to the motor by the electronic controller as a function of the applied voltage, has a tendency to not provide the amount of current required to obtain the acceleration the operator intends. Typically, when a Direct Current (DC) motor's full rated voltage is applied, it will draw about ten times the current at an initial startup condition compared to when operating at its rated power level. The factors which limit the current applied to the motor, are the capacity of the power source (i.e. a battery), the limits of the electronic controller, the line resistance, and the motor internal impedance. Therefore the current could quickly reach the limit of the electronic controller with only partial application of the power control operator interface, resulting in excessive torque and higher acceleration than desired by the operator. This could result in a momentary unsafe level of acceleration, excessive battery drain, and less vehicle range. This is especially true for higher quality motors with minimal internal impedance.

The second method of controlling the power supplied to the motor, alleviates the draw backs mentioned above, but does not properly regulate the speed of the drive wheels which diminishes operator control. For example, under low traction conditions such as sand, water, snow or ice, the drive wheels could quickly spin up to maximum speed with little operator input, this can result in safety hazards.

Further, due to the basic characteristics of electric motors it is beneficial for electric vehicles to be fitted with at least some form of multi-speed, automatic transmission which selects shift points to operate the electric motor or motors in their most efficient RPM range. But when a multi-speed automatic transmission is applied to an electric vehicle, the power control criteria during the shifting process is almost completely different than when applied an Internal Combustion Engine (ICE) vehicle. In this case, many problems arise using either of the existing control methods mentioned above. For example, when using the voltage based power controller, the operator would not know where or when to reposition the operator interface(s) to maintain a desired rate of speed and acceleration, as the transmission is shifted between gears. As a result, the shifting will not be smooth, excessive torque will be transmitted to the drivetrain, the vehicle will accelerate at a rate other than what is desired, and may quickly achieve a speed beyond the intended speed of the operator.

For any given gear ratio, it is most efficient to allow the motor to reach an RPM beyond the peak efficiency before shifting to the next gear ratio. Thus, in order to achieve a desired speed and acceleration of the vehicle, the operator will have to adjust the position of the power control operator interface to compensate for the current vehicle gear ratio. As a result, to accelerate up to the shift point in any given gear, the operator is required to apply nearly full application of the power control operator interface to reach the high motor speed required. Once the vehicle has reached the predetermined speed where it shifts to the next gear, the position of the power control operator interface would need to be repositioned to limit the speed and torque of the motor. Because of the excessive application of power to the motor at the time of shifting, the shifts would not be smooth, a high impulse of torque will be transferred through the drive train causing greater wear and possible failure of the system, the motor will operate at a less efficient level, and it will be more difficult to maintain the desired speed. Unfortunately, the human operator would not be able to adequately perform the operation as described above causing fatigue to the operator, rough shifts, reduced drivetrain life, and possible safety hazards.

Additionally, most known electric vehicle motor controllers implement a "soft start" feature which gradually applies the output power to the motor as the operator input signal is increased. The intent is to make a smooth application of power, rather than allowing a rapid surge of current. The problem that this creates is if the motor speed is not monitored, when the vehicle is already in motion, and the power control operator interface is released and the subsequently re-applied, it may require excessive time until the voltage applied from the motor controller reaches the Back Electromotive Force (BEMF) of the motor at this speed. Until the applied voltage exceeds the motor BEMF no current will flow, and therefore no power will be applied to the drive train.

Similarly, on a vehicle equipped with regenerative braking, when the operator applies the brakes, using the braking control operator interface, producing a similar operator control signal as described above, if a constant load is placed on the drive motor(s), which are now serving as generator(s) to recharge the batteries, as the vehicle slows, less current will be generated, and consequentially there will be less deceleration. In this case, the operator will need to vary the brake position to maintain a desired rate of deceleration. On a vehicle with a multi-speed automatic transmission having predetermined shift points, the problem is compounded as the transmission downshifts and a constant load is maintained on the motor terminals, there will be marked differences in the rate of deceleration as the transmission downshifts to a lower gear ratio. Even when a system implements a constant current output during regenerative braking, the problem will still be present during the downshifts.

Accordingly, there exists the need for an intelligent operator interface for applying both power and braking, controlling both the voltage and current applied to the drive motors which mimics the position of the power control operator interface and the braking control operator interface and does not require the operator to modulate his input based on the selection of varying gear ratios. In addition, there exists the need to reduce the delay between when the operator actuates the power control operator interface and when power is applied to the drivetrain.

Due to the basic characteristics of electric motors, it is beneficial for electric vehicles to be fitted with at least some form of multi-speed automatic transmission which selects shift points to operate the electric motor or motors in a predetermined RPM range. The multi-speed transmission is important in electric vehicles because it is very inefficient to attempt to obtain enough torque from the electric motor to accelerate quickly or climb a steep grade while the electric motor is not in its efficient RPM range, for example, at low vehicle speed with high gearing.

Shifting a multi-speed transmission based on vehicle speed alone does not guarantee an optimum result. The vehicle speed at which the actual optimum shift points occur often vary depending on different vehicle operating conditions and operator inputs. For example, if the vehicle is carrying a heavier payload, experiencing increased external drag, or climbing a steep hill, and the transmission shifts to the next higher gear at a programmed vehicle speed selected for level conditions, motor speed may drop enough to cause the transmission to shift back to the previous lower gear. This often results in the transmission shifting back and forth (i.e., searching) between gears which causes a loss in overall vehicle range, increased wear on parts, and annoys the operator.

Known electric vehicles measure speed in various ways, generally using systems including light or magnetic sensors, to measure the speed of an exposed moving part of the drive train. Such systems, including the sensors and associated wiring, are exposed to the elements and can easily be damaged or knocked out of adjustment. The systems are also subject to failure due to dirt, water, mud and other debris or erroneous signals created from outside sources. Further, the sensors only measure the vehicle's forward speed, and do not measure acceleration or the incline of a road the vehicle is traveling on.

Accordingly, the need remains for a method and apparatus to determine the speed and acceleration of the vehicle, and incline of the road surface, for selection of efficient shift points, which apparatus is not vulnerable to commonly encountered hazards.

BRIEF SUMMARY OF THE INVENTION

The present invention addresses the above and other needs by providing an intelligent shift control which is based on the magnitude and direction of the acceleration of the vehicle, the incline of a road surface the vehicle is operated on, the power applied to the drive motor, and other pertinent data to discriminate between loads created by acceleration, and loads created by additional drag or incline. If the system determines that the acceleration of the vehicle in the forward direction is below a predetermined amount based on motor speed and current, shifting to the next gear will be delayed.

In accordance with one aspect of the invention, there are provided inertial instruments for determining vehicle acceleration, velocity, and inclination. The inertial instruments include accelerometers whose outputs may be compared to determine vehicle acceleration and road incline, integrated to obtain vehicle speed, and combined with data from other sensors and known motor operating characteristics to determine optimum speeds for shifting a multi-speed transmission. Such inertial instruments may be commonly housed with a motor controller and may be encapsulated in potting compound with the motor controller to prevent material contamination, physical damage, or misalignment which may result from using known sensors.

In accordance with another aspect of the present invention, one or more axis accelerometers are used to measure the speed and incline of the vehicle. When used in conjunction with a second speed sensing system independent of the accelerometers, the incline of the vehicle may be determined by comparing the acceleration measured by the fore-aft (or X) axis accelerometer with acceleration measured by the second speed sending system. Any difference in acceleration will indicate that the vehicle is on an incline. The incline of the vehicle may also be obtained from an inertial instrument including two or three accelerometers. One of the accelerometers is aligned in the forward (or X) axis of the vehicle and another of the accelerometers is aligned in the vertical (or Z) axis of the vehicle. To allow even greater accuracy, a third accelerometer may also be aligned along the right/left (or Y) axis of the vehicle to measure if the vehicle is being operated on a crowned road or other type of embankment. Using the only the X and Z accelerometers, the incline of the vehicle be estimated from the component of gravity in the Z accelerometer, the component of gravity in the X accelerometer may be estimated from the vehicle incline and subtracted from the X accelerometer measurement to estimate the vehicle fore-aft acceleration, and the vehicle fore-aft acceleration may be integrating to estimate the vehicle speed. In the case of a three axis accelerometer, the component of gravity orthogonal to the X accelerometer is measured in the combined Y and Z accelerometers and the remaining component of gravity in the X accelerometer is computed, then the component of X acceleration due to vehicle fore-aft acceleration may be estimated by subtracting the component of gravity in the X accelerometer for the X accelerometer measurement.

In accordance with another aspect of the present invention, a variety of speed sensing systems may be used without an accelerometer to determine the instantaneous speed of the vehicle from which the acceleration may be calculated through differentiation techniques.

The data described above maybe used to determine velocity, acceleration, and incline which the vehicle is operating on, and transmission shift points are determined to achieve optimal efficiency. The data is used to reduce unnecessary shifting between gears in order to attain and/or maintain a desired speed. This in turn will reduce stress and wear on the drivetrain, and annoyance to the operator resulting from change in acceleration and noise created when a transmission is shifted.

The data described above may also be used to select the most efficient transmission gear for regenerative braking. For example, when the vehicle is descending an incline, based on operator commands, a transmission gear may be selected to maintain optimal motor RPM for battery recharging and minimizing wear on parts consistent with operator commands to accelerate, decelerate, or maintain present speed.

BRIEF SUMMARY OF THE INVENTION

The present invention addresses the above and other needs by providing a method for controlling an electric vehicle which includes computing an electric motor RPM based on a computed Back Electromotive Force (BEMF). Modern electric vehicle designs include intelligent control of the electric motors and transmissions to respond to operator controls and provide more efficient operation to extend battery life. An accurate measure of motor RPM is required for such control. Various methods are available for obtaining motor RPM, but most require external sensors susceptible to damage from road debris and the like. The BEMF is proportional to motor speed and independent of motor load. The BEMF may further be computed from the difference between impedance losses including IR and magnetic core hysteresis losses and motor voltage. The motor RPM is then computed from BEMF using data recorded for the individual motor.

In accordance with one aspect of the invention, there is provided a method for estimating electric motor RPM based on a computed Back Electromotive Force (BEMF) of the electric motor. The method includes obtaining RPM versus the BEMF data for the electric, estimating a real time BEMF of the electric motor during the later use of the electric motor, and estimating the electric motor RPM by comparing the real time BEMF to the recorded BEMF versus RPM data. Obtaining RPM versus the BEMF data for the electric motor includes rotating the motor shaft over an RPM range covering the normal operating range of the electric motor, measuring BEMF versus RPM over the RPM range, and recording the BEMF versus RPM data for later real time use. Estimating a real time BEMF of the electric motor during the later use of the electric motor includes measuring a motor voltage at electric motor terminals, measuring a motor current through the electric motor corresponding to the motor voltage measurement, computing IR loss by multiplying the motor current times a dynamic internal resistance of the electric motor, and computing the BEMF by subtracting the IR loss from the motor voltage.

In accordance with another aspect of the invention, the motor current may be determined when power is applied to input terminals of a motor controlled using Pulse Width Modulation (PWM) or similar technique. Using PWM to control a motor, the average power supplied to the motor is regulated by switching the output of the controller between an "ON" and "OFF" state thus rapidly switching between the source (battery) voltage applied to the motor and zero voltage applied to the motor. When the switching device transitions to the OFF state, the BEMF created by the inductive component of the motor (created by windings of the motor around a magnetic core) will create a pulse of current causing a voltage spike having a polarity opposite the battery voltage applied to the input terminals when the switching device is ON. The BEMF spike is generally clamped by a diode (or other comparable device allowing current to only freely flow in one direction) which is electrically connected across the input terminals of the motor which is reverse biased during the "ON" cycle, and forward biased as the motor inductance produced BEMF is flowing. While the inductive BEMF current is flowing, the voltage measured across the input terminals of the motor is essentially zero. Once the BEMF current stops flowing, the diode turns off, and the measured voltage will be the generated BEMF as a result of the rotation of the motor. The average current supplied to the motor by the battery is determined by comparing the duty cycle of the applied PWM to the measured motor voltage. As more load is placed on the motor resulting in higher current draw, there is a change in the time the inductive BEMF is flowing, causing a change in the measured motor voltage across the input terminals. Based on the characteristics of the motor, the average current supplied to the motor by the battery is determined by comparing the applied PWM duty cycle to the measured motor voltage. For example, if a 50% duty cycle power signal is applied to the motor the average voltage applied is 50% of the battery voltage. When the actual voltage of the motor is measured the value may be 75% of the applied voltage as a result of the clamping voltage while the inductive BEMF is flowing and the generated BEMF during the remainder of the "OFF" cycle, These two values are compared with the characteristics of the given motor to determine the current drawn by the motor. At another time, for the same applied PWM duty cycle, the measured motor voltage may be 65% of the applied battery voltage, indicating a different current draw of the motor.

The present invention addresses the above and other needs by creating an Intelligent Electronic Control System (IECS) which includes an intelligent controller between the power control operator interface and an electronic motor controller providing the timing and level of power to the electric motor (s). The position of the power control operator interface indicates both the desired acceleration and desired speed of the vehicle. Therefore, the intelligent controller is programmed to determine the appropriate power required by the motor before and after a shift, to not only provide a smooth transition, but also the desired acceleration and end speed, if possible. The intelligent controller receives operator signals from power and braking control operator interfaces, and other input signals which may include battery voltage, motor or motors voltage and current, motor temperature, acceleration information, vehicle rotational data, wheel speed, steering position data, vehicle incline, and other data. An adjusted operator signal is determined using circuitry and optionally software algorithms designed to optimize efficiency, maximize power, and smooth power transmission to the drive train. The adjusted operator signal is sent to the electronic motor controller and transmission control signals may be sent to the transmission as applicable.

In accordance with one aspect of the invention, there is provided a method for controlling power and braking of an electric vehicle. The method includes measuring positions of a power control operator interface and the braking control operator interface, converting the positions to a power signal and a braking signal, processing the power signal and the braking signal to obtain adjusted power and braking signal to provide a desired acceleration or braking compensating for vehicle speed, motor speed, transmission gearing, road incline, etc., and providing voltage and current to and from a motor based on the adjusted power and braking signal.

The present invention still further addresses the above and other needs by providing an intelligent shift control which is based on the magnitude and direction of the acceleration of the vehicle, the incline of a road surface the vehicle is operated on, the power applied to the drive motor, and other pertinent data to discriminate between loads created by acceleration, and loads created by additional drag or incline. If the system determines that the acceleration of the vehicle in the forward direction is below a predetermined amount based on motor speed and current, shifting to the next gear will be delayed.

In accordance with one aspect of the invention, there are provided inertial instruments for determining vehicle acceleration, velocity, and inclination. The inertial instruments include accelerometers whose outputs may be compared to determine vehicle acceleration and road incline, integrated to obtain vehicle speed, and combined with data from other sensors and known motor operating characteristics to determine optimum speeds for shifting a multi-speed transmission. Such inertial instruments may be commonly housed with a motor controller and may be encapsulated in potting compound with the motor controller to prevent material contamination, physical damage, or misalignment which may result from using known sensors.

In accordance with another aspect of the present invention, one or more axis accelerometers are used to measure the speed and incline of the vehicle. When used in conjunction with a second speed sensing system independent of the accelerometers, the incline of the vehicle may be determined by comparing the acceleration measured by the fore-aft (or X) axis accelerometer with acceleration measured by the second speed sending system. Any difference in acceleration will indicate that the vehicle is on an incline. The incline of the vehicle may also be obtained from an inertial instrument including two or three accelerometers. One of the accelerometers is aligned in the forward (or X) axis of the vehicle and another of the accelerometers is aligned in the vertical (or Z) axis of the vehicle. To allow even greater accuracy, a third accelerometer may also be aligned along the right/left (or Y) axis of the vehicle to measure if the vehicle is being operated on a crowned road or other type of embankment. Using the only the X and Z accelerometers, the incline of the vehicle be estimated from the component of gravity in the Z accelerometer, the component of gravity in the X accelerometer may be estimated from the vehicle incline and subtracted from the X accelerometer measurement to estimate the vehicle fore-aft acceleration, and the vehicle fore-aft acceleration may be integrating to estimate the vehicle speed. In the case of a three axis accelerometer, the component of gravity orthogonal to the X accelerometer is measured in the combined Y and Z accelerometers and the remaining component of gravity in the X accelerometer is computed, then the component of X acceleration due to vehicle fore-aft acceleration may be estimated by subtracting the component of gravity in the X accelerometer for the X accelerometer measurement.

In accordance with another aspect of the present invention, a variety of speed sensing systems may be used without an accelerometer to determine the instantaneous speed of the vehicle from which the acceleration may be calculated through differentiation techniques.

The data described above maybe used to determine velocity, acceleration, and incline which the vehicle is operating on, and transmission shift points are determined to achieve optimal efficiency. The data is used to reduce unnecessary shifting between gears in order to attain and/or maintain a desired speed. This in turn will reduce stress and wear on the drivetrain, and annoyance to the operator resulting from change in acceleration and noise created when a transmission is shifted.

The data described above may also be used to select the most efficient transmission gear for regenerative braking. For example, when the vehicle is descending an incline, based on operator commands, a transmission gear may be selected to maintain optimal motor RPM for battery recharging and minimizing wear on parts consistent with operator commands to accelerate, decelerate, or maintain present speed.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
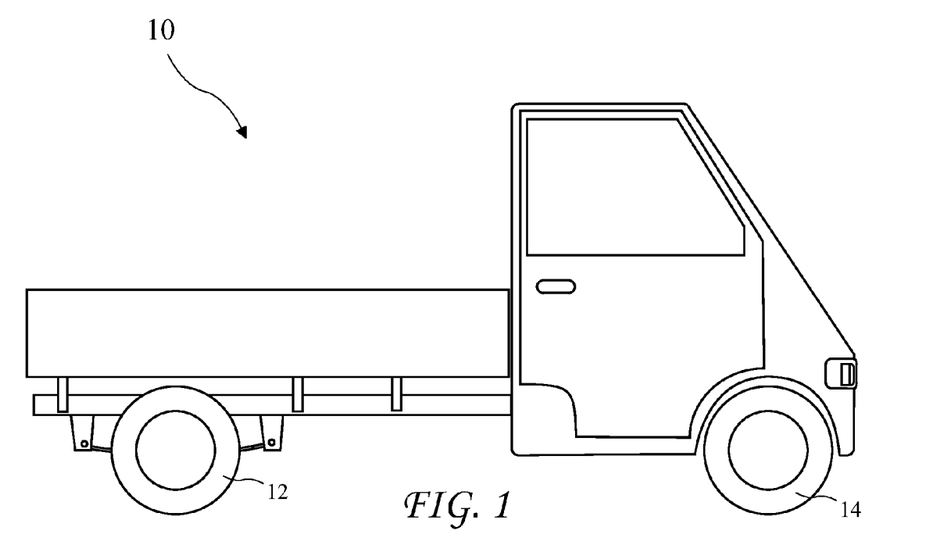
FIG. 1 is an electric vehicle suitable for application of the present invention.
Figure 2:
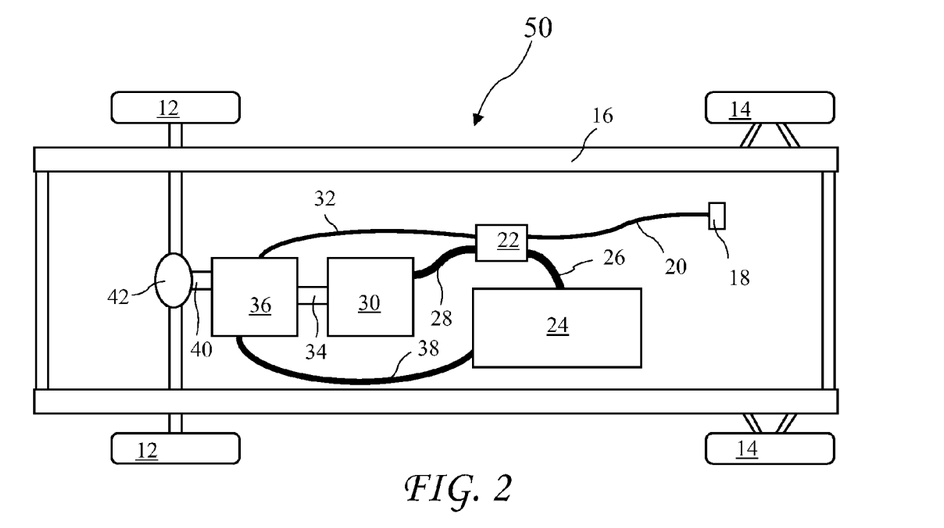
FIG. 2 is a drivetrain according to the present invention for application with the electric vehicle.

An electric vehicle 10 suitable for application of the present invention is shown in FIG. 1 and a drivetrain 50 according to the present invention and suitable for use in the vehicle 10 is shown in FIG. 2. The drivetrain 50 includes a drive shaft 40 and an axle 42 connected to drive wheels 12 for driving the vehicle 10. Operator controls 18 are used by an operator to control the driving force provided by the wheels 12. The controls 18 may be foot control, hand controls, or any form of control useable by an operator. In an instance of a remotely controlled vehicle 10, the controls 18 may be a signal receiver. The controls 18 are connected by an operator signal cable 20 carrying an operator control signal to a controller (or electronic motor/transmission controller) 22. Batteries 24 are connected to the electronic motor/transmission controller 22 by battery power cable 26. The electronic motor/transmission controller 22 processes the operator signal and uses Pulse Width Modulation (PWM) to control the power provided through power cable 28 to an electric motor 30, and to generate transmission control signals provided through transmission control signal cable 32 to a transmission 36 to control gear changing and clutch engagement/disengagement and provide feedback signals from the transmission 36 to the electronic motor/transmission controller 22. Power may also may be carried back to the battery 24 during regenerative braking over cables 28 and 26.

The motor 30 is coupled the transmission 36 through motor coupling 34. The motor coupling 34 may be a belt, a shaft, or any other mechanical coupling for carrying mechanical power. The transmission 36 is coupled to the axle 42 by transmission coupling 40 which also may be a belt, a shaft, or any other mechanical coupling for carrying mechanical power. The vehicle 10 may be rear wheel drive, front wheel drive, or all wheel drive, and adaptation of the drivetrain described herein is equally applicable to any selected drive wheel(s) configuration. In the embodiment shown in FIG. 2, the front wheels 14 are used for steering only.

Figure 3:
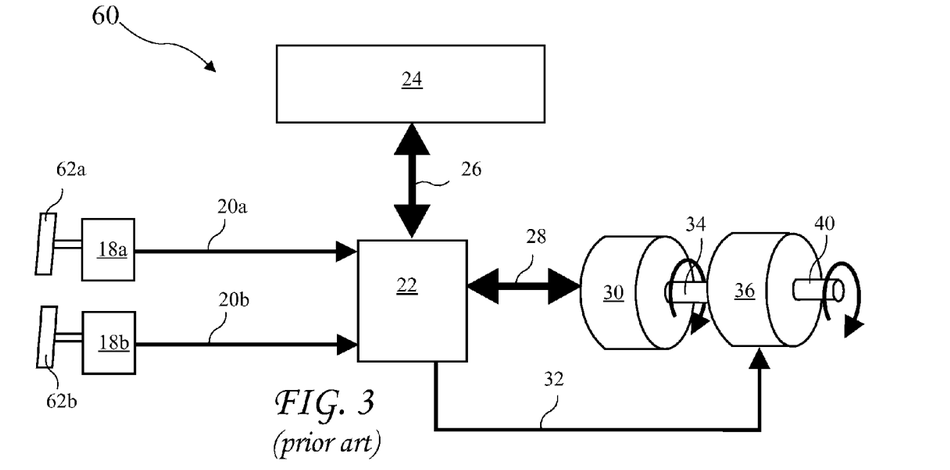
FIG. 3 is a prior art electronic control system for use with the electronic vehicle.

A prior art electronic control system 60 for the electric vehicle 10 is shown in FIG. 3. Power and braking actuators (or control operator interfaces) 62a and 62b respectively are mechanically coupled to a power signal transducer 18a and a braking signal transducer 18b respectively. A power signal 20a and a braking signal 20b are generated by the transducers 18a and 18b and provided to the electronic motor/transmission controller 22. The electronic motor/transmission controller 22 controls a first flow of current from the battery 24 to the electric motor 30 through cables 26 and 28 for providing power in response to the power signal 20a, and controls a second opposite flow of current from the electric motor 30 to the battery 24 through cables 26 and 28 for providing electricity to recharge the battery 24 in response to the braking signal 20b. The electric motor 30 provides mechanical power to the transmission 36 through the coupling 34 and the transmission 36 provides mechanical power to the vehicle 10 through the coupling 40. While the electronic control system 60 may prove adequate in some instance, it does not always result in power and braking which accurately mimics the positions of the power and braking actuators 62a and 62b.

Figure 4:
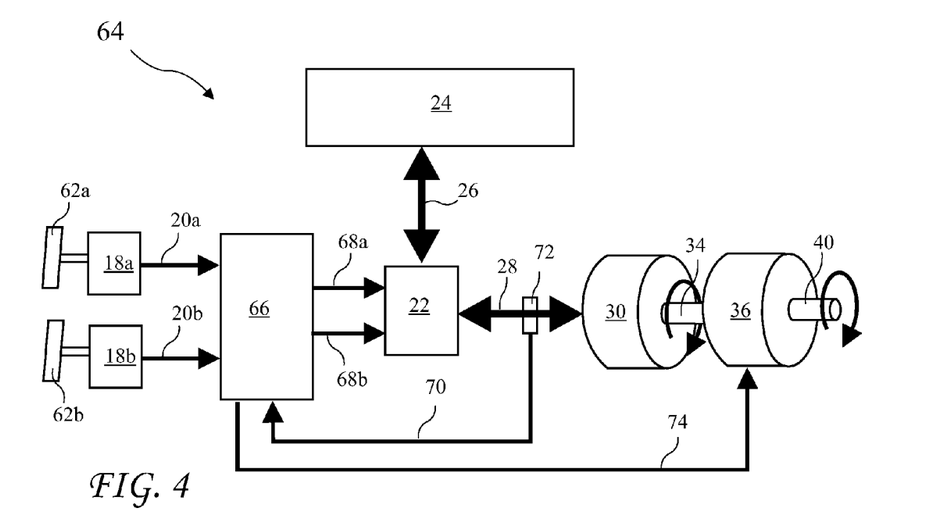
FIG. 4 is an Intelligent Electronic Control System (IECS) for use with the electronic vehicle.

An Intelligent Electronic Control System (IECS) 64 according to the present invention is shown in FIG. 4 which includes an intelligent controller 66 which provides adjusted operator power and braking signals 68a and 68b to the electronic motor/transmission controller 22 to provide power and regenerative braking which mimic the positions of the power and braking actuators 62a and 62b. The power signal 20a and the braking signal 20b, along with motor voltage and current signals 70, are provided to an intelligent controller 66. The intelligent controller 66 computes and provides adjusted power and braking signals 68a and 68b to the electronic motor/transmission controller 22, and transmission control signals 74 to the transmission 36, to provide vehicle speed, acceleration and braking which mimic the positions of the power and braking actuators 62a and 62b. The motor voltage and current signals 70 are obtained from voltage and current sensors 72 electrically cooperating with the cable 28 between the electronic motor/transmission controller 22 and the electric motor 30. Motor 30 RPM is generally an important input to the intelligent controller 66.

Figure 5:
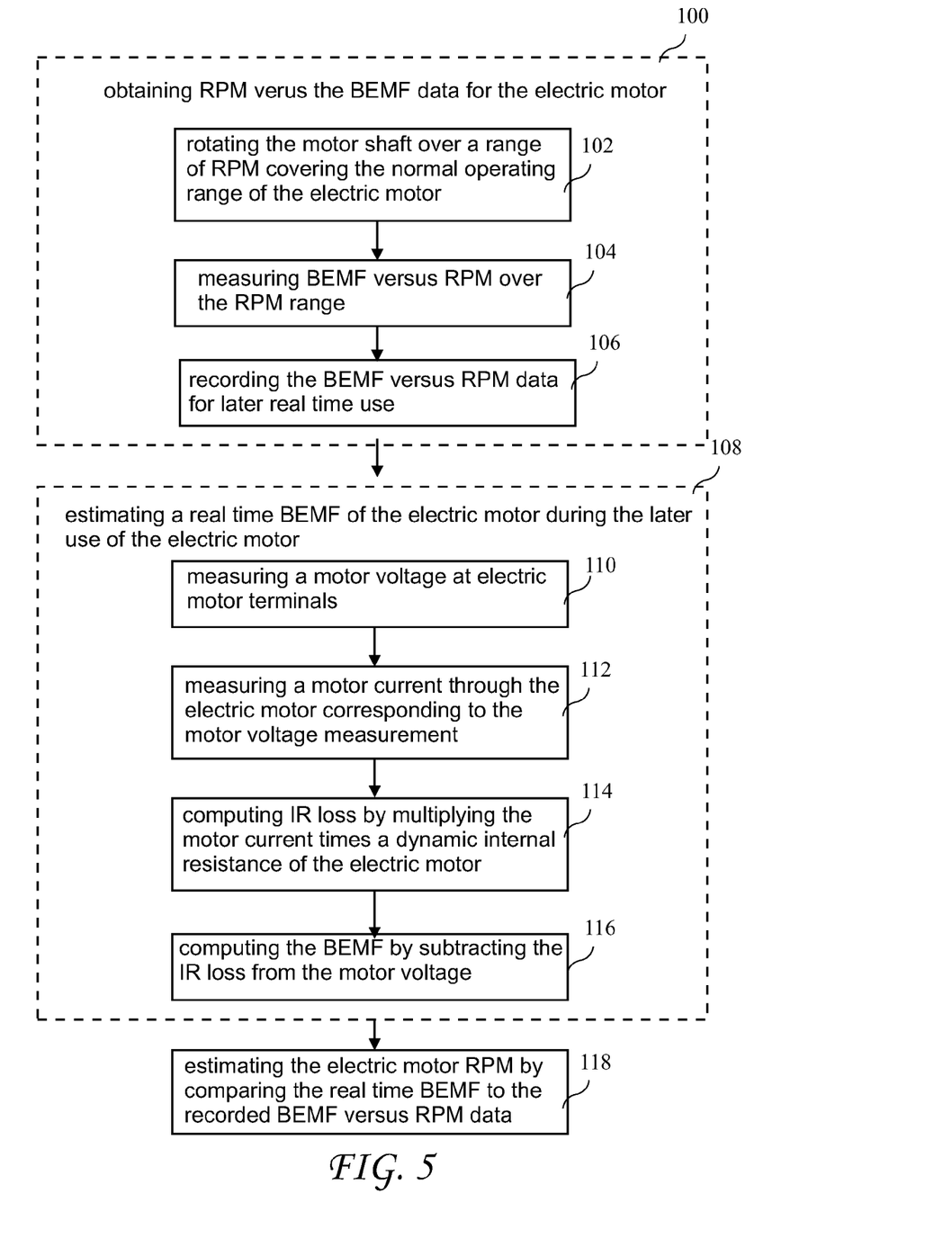
FIG. 5 is a method for computing motor RPM for input to the IECS based on Back Electromotive Force (BEMF) according to the present invention.

A method for estimating electric motor RPM based on computed Back Electromotive Force (BEMF) of the electric motor 30 according to the present invention is described in FIG. 5. The method includes obtaining RPM verus the BEMF data for the electric motor 30 at step 100 which need only be performed once and may be performed before the motor 30 is installed in the vehicle 10, estimating a real time BEMF of the electric motor at step 108, and estimating the electric motor RPM by comparing the real time BEMF to the recorded BEMF versus RPM data at step 118. The estimated RPM may then be provided to the intelligent controller 66 to optimally control the motor 30 and the transmission 36.

Obtaining RPM verus the BEMF data for the electric motor 30 at step 100 includes rotating a motor shaft of the electric motor over a range of RPM covering the normal operating range of the electric motor at step 102, measuring BEMF versus RPM over the RPM range at step 104, and recording the BEMF versus RPM data for later real time use of the electric motor at step 106.

Estimating a real time BEMF of the electric motor at step 108 includes measuring a motor voltage at electric motor terminals at step 110, measuring a motor current through the electric motor corresponding to the motor voltage measurement at step 112, computing IR loss by multiplying the motor current times a dynamic internal resistance of the electric motor at step 114, and computing the BEMF by subtracting the IR loss from the motor voltage at step 116 (The polarity of the computed IR loss will be positive when the motor is driving the vehicle, and negative when the motor is generating current in the opposite direction as in the case of regenerative braking, and zero when no current is flowing through the motor as is the case if the motor is electrically disconnected).

The present invention further includes an improved method of providing a smoother and more intuitive operator control of speed, power, and regenerative braking as it applies to all electric vehicles with and without multi-speed automatic transmissions. The first step in determining the correct power or braking to be applied be the motor or motors is determining the operator's intent from the position of the power actuator 62a and/or braking actuator 62b. The operator's positioning of the power actuator 62a at a given position is an indication of intent to achieve a desired acceleration, to coast down to a lower speed, and/or to achieve and maintain a desired speed. The operator's positioning of the braking actuator 62b to a given position is an indication of intent to achieve a desired rate of forced deceleration (i.e., greater deceleration than resulting from coasting).

In general, the desired terminal vehicle speed will increase according to a function of the position of the power actuator 62a as the power actuator 62a is advanced. Accordingly, the current provided to the electric motor 30, which current will control the acceleration of the vehicle 10, will be controlled based on a function relating the position of the power actuator 62a compared to the present vehicle speed. In general, the percentage that the position of the power actuator 62a is of full travel of the power actuator 62a, is compared to the percentage that the current vehicle speed is of the maximum vehicle speed. The applied current will be controlled to reduce differences between these percentages, subject to the conditions described above.

Similarly, the amount of total braking will be a function of the position or force on the braking control user interface 62b as compared to a fully applied position or force on the braking control user interface 62b. If greater braking is required than what may be achieved though the regenerative braking by the motor or motors 30 for the currently selected gear ratio, the regenerative braking must be supplemented by the vehicle's friction brakes. When operating at maximum regenerative braking, the current may change as the vehicle speed changes, and as different gear ratios are activated, and it may be interrupted, for example, during a downshift. When such variations in the level of regenerative braking occurs, the regenerative current will be gradually increased up to the current determined by the position or force on the braking control user interface 62b. This will allow the operator enough reaction time to ease off on the braking control user interface 62b and allow the braking to be primarily the regenerative braking. As long as there is sufficient regenerative braking available to maintain the level of deceleration that the operator has indicated by the application of the braking control user interface 62b, the present invention will automatically adjust the application of generated current to the batteries to maintain a nearly constant level of deceleration.

During vehicle acceleration, based on the speed and acceleration as determined from applying the relationships discussed above applied to the position of the power actuator 62a, and the present vehicle speed, the intelligent controller 66 will supply the adjusted operator power signals 68a to the electronic motor controller 22. As a result, the electronic motor controller 22 will supply an averaged voltage to the motor 30 required to provide the amount of current needed to accelerate the vehicle 10 corresponding to the power actuator 62a position. The actual current flowing in the motor 30 may be monitored using a variety of current sensing devices such as a Hall Effect device which measures the magnetic flux of the path of current which is proportional to the flow of current, or a current shunt which is a resistance place in series with the flow of current to the motor and creates a small voltage drop which is proportional to the flow of current. As the vehicle reaches the desired speed, the current will be kept at a level necessary to overcome the drag at the desired speed and thus maintain a constant speed which may be monitored by wheel speed sensor, drive motor Back Electromotive Force (BEMF), or other means.

In addition to adjusting the signal to the electronic motor controller 22, as the motor's rotational speed increases as the vehicle accelerates to the point it is determined that the next gear ratio is to be selected, the intelligent controller 66 predicts the power required to maintain the desired acceleration after shifting to the next higher gear ratio, and re-computes the adjusted power signals 68a to obtain the required power. An example of this is illustrated as follows: the power signal 20a received from the power signal transducer 18a is processed and at the time of the shift to the higher gear ratio, indicates a desired acceleration of 0.1 g. Prior to the shift, the amount of current required to provide to torque necessary to achieve acceleration of 0.1 g acceleration is 100 A. The next gear ratio is 0.65 of the current ratio. Therefore as the vehicle shifts into the higher gear, the motor 30 will operate at 0.65 the previous speed, but will require about 1.54 (1/0.65) times the current needed to drive the wheel at the same level of torque (acceleration). To achieve the output, the voltage supplied to the motor 30 must be reduced from the previous level necessary to reach the nearly full rated speed of the motor, to a level needed to supply the current required to supply torque that is 1.54 times greater than prior to the shift. Additionally, the actual acceleration of the vehicle 10 may be monitored, and the current and resulting motor torque may be adjusted to maintain a constant acceleration as the gear selection is made. If, due to system limitations, this current cannot be supplied, but yet it is determined that the vehicle is able to at least maintain its speed, then the electronic motor controller 22 will supply the maximum current available.

During the phase of operation where the power actuator 62a is held steady indicating that the operator desires to maintain a constant vehicle speed, the motor or motors current will be varied to maintain a constant speed. In addition if greater or less power is necessary to maintain this speed at high efficiency, the motors may be switched on and off and if necessary the optimal gear ratio will be selected to attempt to maintain this speed.

Similarly, during a deceleration of the vehicle 10, as the position of the power actuator 62a is retracted, the current will be reduced allowing the vehicle 10 to decelerate at a rate which is a function relating the position of the power actuator 62a compared to the present vehicle speed. In general, the greater the difference between the position of the power actuator 62a and the maximum power actuator 62a position, compared to the current vehicle speed compared to the maximum vehicle speed, the more current reduction will take place, up to the point where no current and possibly even reversal of current for regenerative braking will be applied.

For example, if the vehicle was maintaining a speed for the power actuator 62a set at 75 percent of full "throttle", and the "throttle" is repositioned to 65 percent of the full "throttle" the vehicle 10 will decelerate at a slower rate until it reaches the speed determined as function of 65 percent of the maximum power actuator 62a position as compared to a second instance where the power actuator 62a is repositioned at 50 percent of the maximum power actuator 62a position. In this second instance, the vehicle 10 will initially decelerate at a faster rate and subsequently stabilize at a lower speed if the power actuator 62a is held stable. Similarly, as the vehicle 10 is decelerating, if the transmission 36 is required to shift to a lower ratio in order to maintain good motor efficiency, the current will be adjusted as the lower gear ratio is engaged in order to maintain a consistent deceleration of the vehicle before and after the shift.

Figure 6:
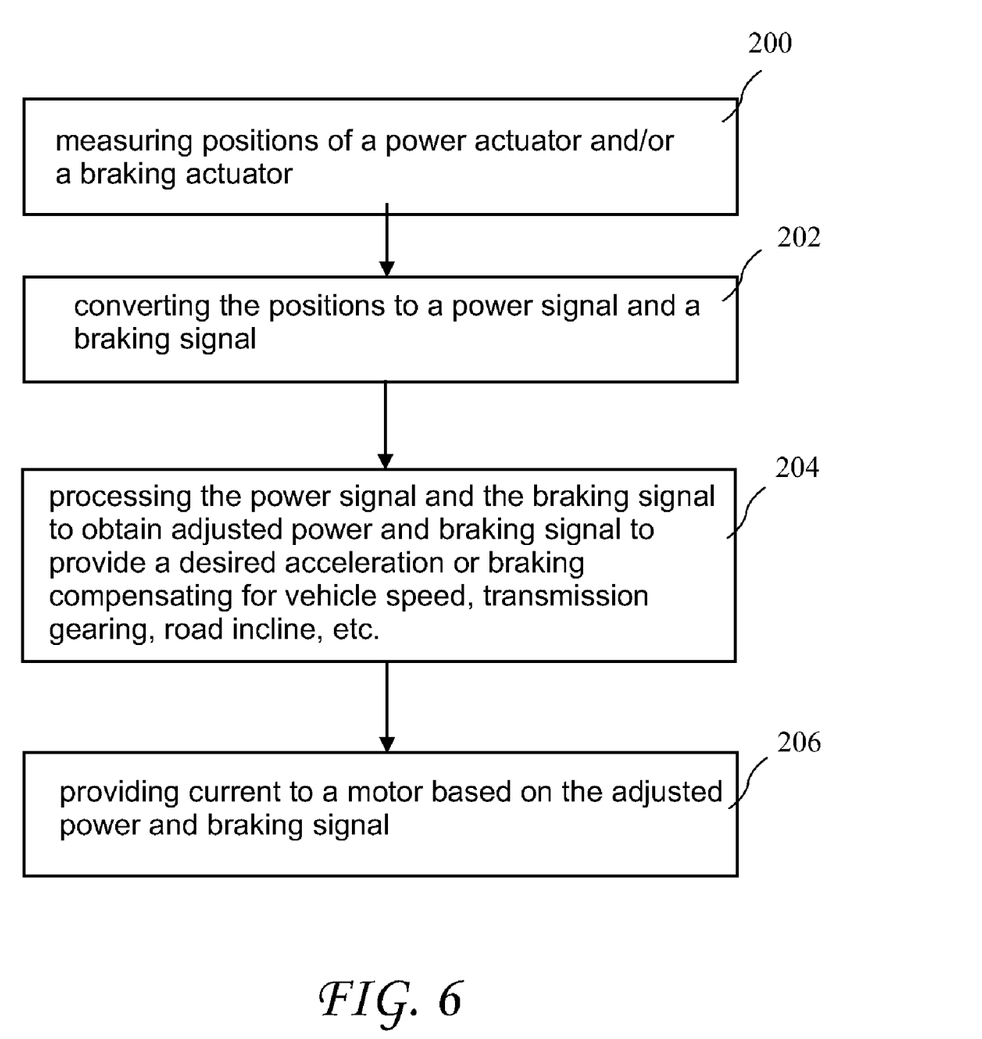
FIG. 6 is a method for determining adjusted power and braking signals according to the present invention.

A method for determining the adjusted power and braking signals 68a and 68b is described in FIG. 6. The method includes measuring positions of a power actuator and/or a braking actuator at step 200, converting the positions to a power signal and a braking signal at step 202, processing the power signal and the braking signal to obtain adjusted power and braking signal to provide a desired acceleration or braking compensating for vehicle speed, transmission gearing, road incline, etc. at step 204, and providing current to a motor based on the adjusted power and braking signal at step 206.

The present invention further provides a reliable, rugged system used to determine the speed of the vehicle 10 and the components of load applied to the drivetrain 50 of the electric vehicle 10 due to acceleration, operation on an incline, and/or drag. The acceleration measured by the X axis accelerometer may result from acceleration of the vehicle in the forward direction or by gravitational forces caused by operating the vehicle 10 on an incline. The derived speed and acceleration force information is used by the electronic controller 22 to determine proper points to shift gears in the transmission 36.

Figure 7:
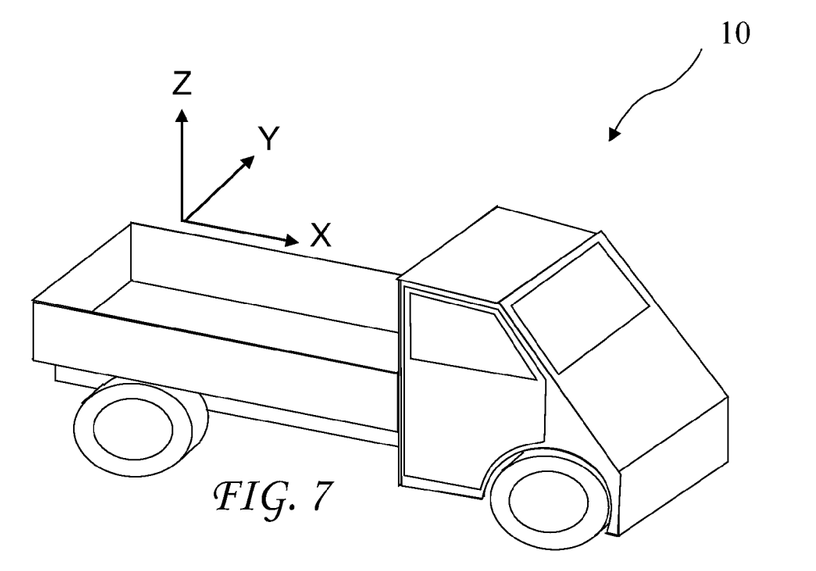
FIG. 7 describes an X, Y, Z coordinate system for the vehicle.

A perspective view of the vehicle 10 and a three axes X, Y, Z coordinate system fixed to the vehicle 10 is shown in FIG. 7. The X axis points forward in the direction of motion of the vehicle 10, the Y axis points to the side, and the Z axis points up. A first embodiment of the present invention includes a three-axis inertial sensor suite including three accelerometers aligned to the X, Y and Z axes of the vehicle 10, hereafter referred to as the X accelerometer, the Y accelerometer, and the Z accelerometer respectively. The inertial sensor suite provides three signals to the electronic controller 22 corresponding and proportional to the accelerations sensed by the inertial sensor suite along the X, Y, and Z axes.

While the vehicle is at a constant velocity on level ground, the X and Y accelerometers provide X and Y accelerometer signals corresponding to zero acceleration, and the Z accelerometer signal corresponds to gravity G. As the vehicle 10 accelerates or decelerates, the X accelerometer signal measures the fore-aft vehicle acceleration or deceleration. As the vehicle 10 is operated over mixed terrain with various inclines, the accelerometer signals are processed by in the electronic controller 22. The X, Y, and Z accelerometer signals are then processed to compute the speed and incline of the vehicle 10.

Figure 8:
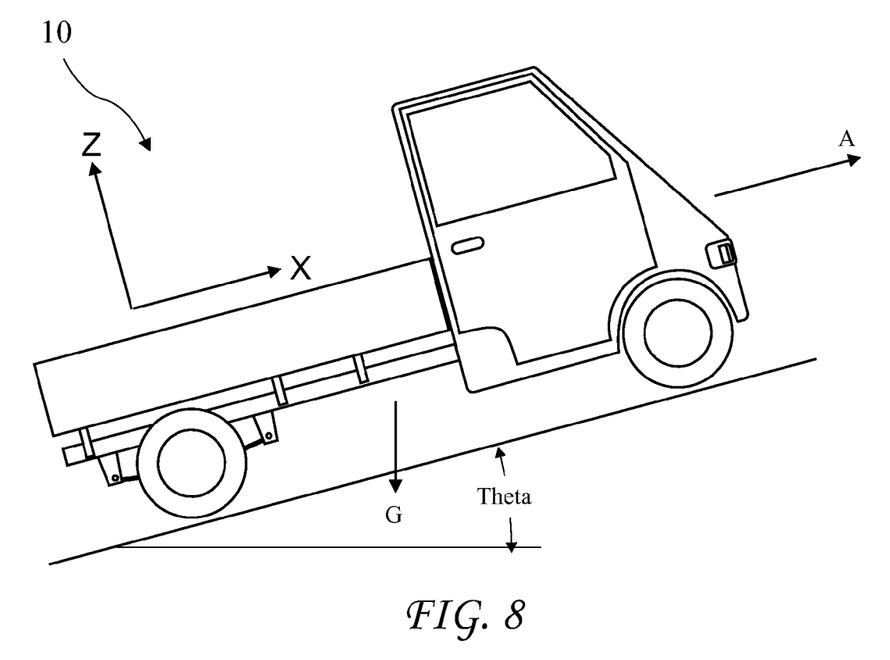
FIG. 8 shows the relationship between gravity and the X, Y, Z coordinate system.

The vehicle 10 is shown on a positive incline in FIG. 8. The X, Y, and Z axes are fixed to the vehicle 10 and thus rotate with the vehicle 10. The incline of the vehicle 10 may be computed by taking the inverse cosine of an averaged or smoothed Z acceleration signal "Z" divided by g. For example, when the incline is zero on a flat road, the Z accelerometer will measure g and the incline will be the arccos(g/g) which is zero degrees. When the incline is not zero, the arccos(Z/g), ignoring the Y accelerometer, reflects the angle of the incline. Driving on an incline will cause a component of gravity G to be measured by the X accelerometer and seen in the X accelerometer signal even when the vehicle is stationary or moving at a constant velocity.

From another perspective, Using the component of g measured by both the Y and Z accelerometers, the component of gravity g in the X accelerometer signal, Xg, may be computed and then subtracted from the total X accelerometer signal to yield the actual fore-aft acceleration of the vehicle 10.

Once the actual fore-aft acceleration of the vehicle 10 is determined, the speed of the vehicle 10 in the fore-aft direction may be determined by summing (or integrating), from rest, the product of incremental fore-aft acceleration in the X direction and the time increment. As the time increment for sampling the fore-aft acceleration is decreased, the measurement errors resulting from slight fluctuations during the sampling time interval will be reduced. The fore-aft acceleration, fore-aft speed, and incline estimates may then be used to determine optimal shift points for the vehicle 10. The fore-aft acceleration, incline and speed estimates are used to determine optimal gear selection.

In one embodiment, the sensor suite is a solid state sensor suite. When the accelerometers signals are provide as analog signals, the analog signals are fed through any necessary amplifiers, attenuator filters or other signal conditioning and then through an Analog to Digital Converter (ADC) and to digital processors in the electronic controller 22.

Figure 9:
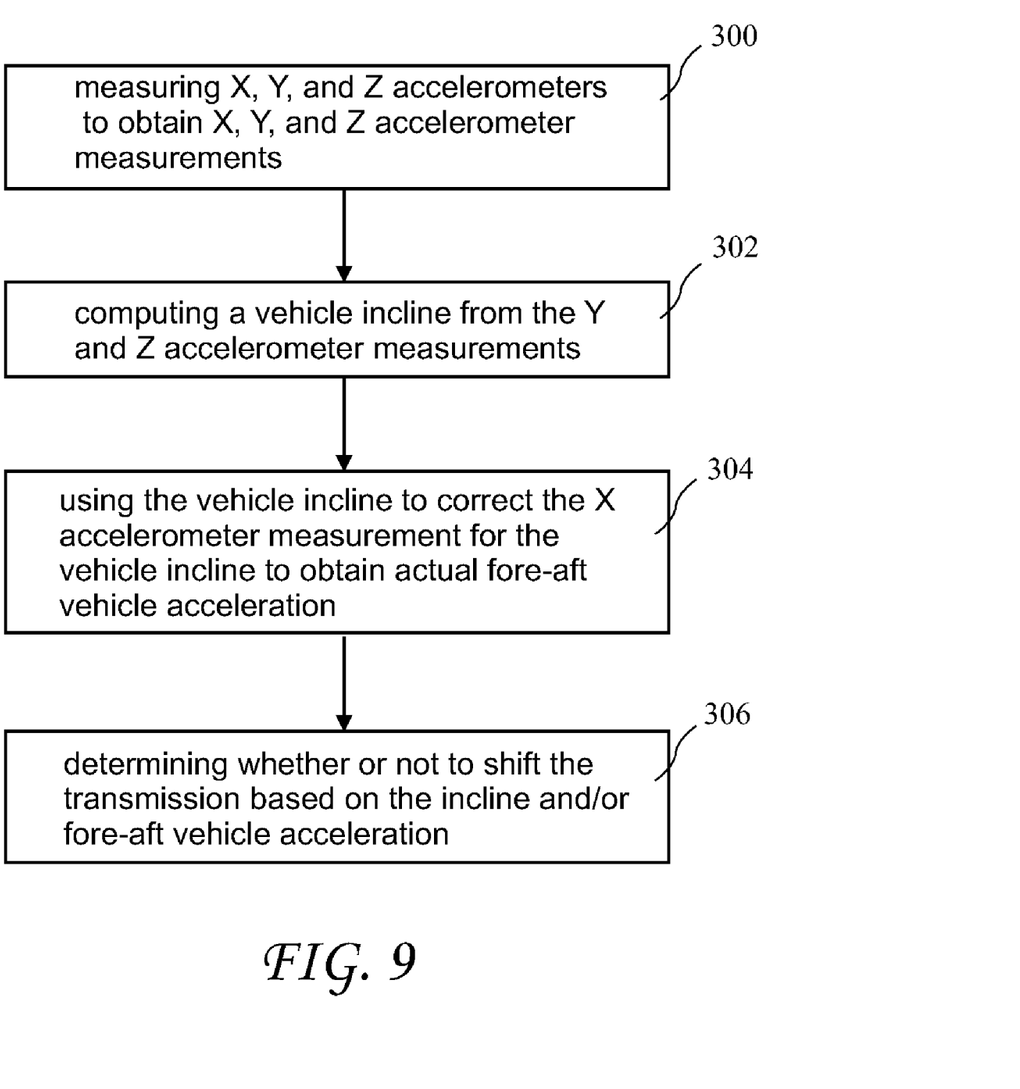
FIG. 9 is a method according to the present invention for determining shift points.

A method according to the present invention is described in FIG. 9. The method includes measuring X, Y, and Z accelerometers to obtain X, Y, and Z accelerometer measurements at step 300, computing a vehicle incline from the component of gravity in the Y and Z accelerometer measurements at step 302, using the vehicle incline to correct the X accelerometer measurement for the vehicle incline to obtain fore-aft vehicle acceleration at step 304, and determining whether or not to shift the transmission based on the incline and/or fore-aft acceleration at step 306. The fore-aft vehicle acceleration may provide an indication of greater than expected drag on the vehicle 10 and indicate that shifting should be delayed.

A second method for determining optimal shift points includes: measuring X, Y, and Z accelerometers to obtain Xm, Ym, and Zm accelerometer measurements; computing a YZ component of gravity YZg from the Y and Z accelerometer measurements Ym and Zm; computing an X component of gravity Xg in the X accelerometer by subtracting the YZ component of gravity YZg from known gravity g; computing fore-aft vehicle acceleration by subtracting the X component of gravity Xg from the X accelerometer measurement Xm; and determining whether or not to shift the transmission based on the X component of gravity Xg and the fore-aft vehicle acceleration.

While the invention herein disclosed has been described by means of specific embodiments and applications thereof, numerous modifications and variations could be made thereto by those skilled in the art without departing from the scope of the invention set forth in the claims.

I claim:

1. A method for estimating electric motor RPM based on a computed Back Electromotive Force (BEMF) of the electric motor, the method comprising:
    obtaining RPM versus the BEMF data for the electric motor comprising:
        rotating the motor shaft of the electric motor over an RPM range covering the normal operating range of the electric motor;
        measuring BEMF versus RPM over the RPM range; and
        recording the BEMF versus RPM data for later real time use;
    estimating a real time BEMF of the electric motor during the later use of the electric motor, comprising:
        measuring a motor voltage at electric motor terminals;
        measuring a motor current through the electric motor corresponding to the motor voltage measurement;
        computing IR loss by multiplying the motor current times a dynamic internal resistance of the electric motor; and
        computing the BEMF by subtracting the IR loss from the motor voltage;

estimating the electric motor RPM by comparing the real time BEMF to the recorded BEMF versus RPM data; and providing the estimated RPM to an intelligent controller to optimally control the motor.

2. The method of claim 1, further including providing the estimated RPM to an intelligent controller to optimally control a transmission.

* * * * *